(12) United States Patent
Adams et al.

(10) Patent No.: US 9,099,087 B2
(45) Date of Patent: Aug. 4, 2015

(54) METHODS AND SYSTEMS FOR OBTAINING LANGUAGE MODELS FOR TRANSCRIBING COMMUNICATIONS

(75) Inventors: Jeffrey P. Adams, Tyngsborough, MA (US); Kenneth Basye, Sutton, MA (US); Ryan Thomas, Redmond, WA (US); Jeffrey C. O'Neill, Somerville, MA (US)

(73) Assignee: Canyon IP Holdings, LLC, Wilmington, DE (US)

( * ) Notice: Subject to any disclaimer, the term of this patent is extended or adjusted under 35 U.S.C. 154(b) by 700 days.

(21) Appl. No.: 13/221,897

(22) Filed: Aug. 30, 2011

(65) Prior Publication Data

US 2012/0059653 A1 Mar. 8, 2012

Related U.S. Application Data

(60) Provisional application No. 61/379,781, filed on Sep. 3, 2010.

(51) Int. Cl.
*G10L 15/18* (2013.01)
*G10L 15/19* (2013.01)
(52) U.S. Cl.
CPC ................................. *G10L 15/19* (2013.01)

(58) Field of Classification Search
USPC .................................... 704/231–257
See application file for complete search history.

(56) References Cited

U.S. PATENT DOCUMENTS

| | | | |
|---|---|---|---|
| 6,366,886 B1 * | 4/2002 | Dragosh et al. | 704/270.1 |
| 7,310,601 B2 * | 12/2007 | Nishizaki et al. | 704/240 |
| 8,898,065 B2 * | 11/2014 | Newman et al. | 704/275 |
| 2005/0182628 A1 * | 8/2005 | Choi | 704/252 |
| 2007/0233488 A1 * | 10/2007 | Carus et al. | 704/257 |
| 2011/0161072 A1 * | 6/2011 | Terao et al. | 704/9 |
| 2011/0296374 A1 * | 12/2011 | Wu et al. | 717/104 |

OTHER PUBLICATIONS

Amanda Stent et al., "Geo-Centric Language Models for Local Business Voice Search," Human Language Technologies: The 2009 Annual Conference of the North American Chapter of the ACL, pp. 386-396, 2009.
Xiaoyan Li et al., "Time based language models," CIKM '03 Proceedings of the twelfth international conference on Information and knowledge management, pp. 469-475, 2003.

* cited by examiner

*Primary Examiner* — Abul Azad

(57) ABSTRACT

A method for producing speech recognition results on a device includes receiving first speech recognition results, obtaining a language model, wherein the language model represents information stored on the device, and using the first speech recognition results and the language model to generate second speech recognition results.

23 Claims, 5 Drawing Sheets

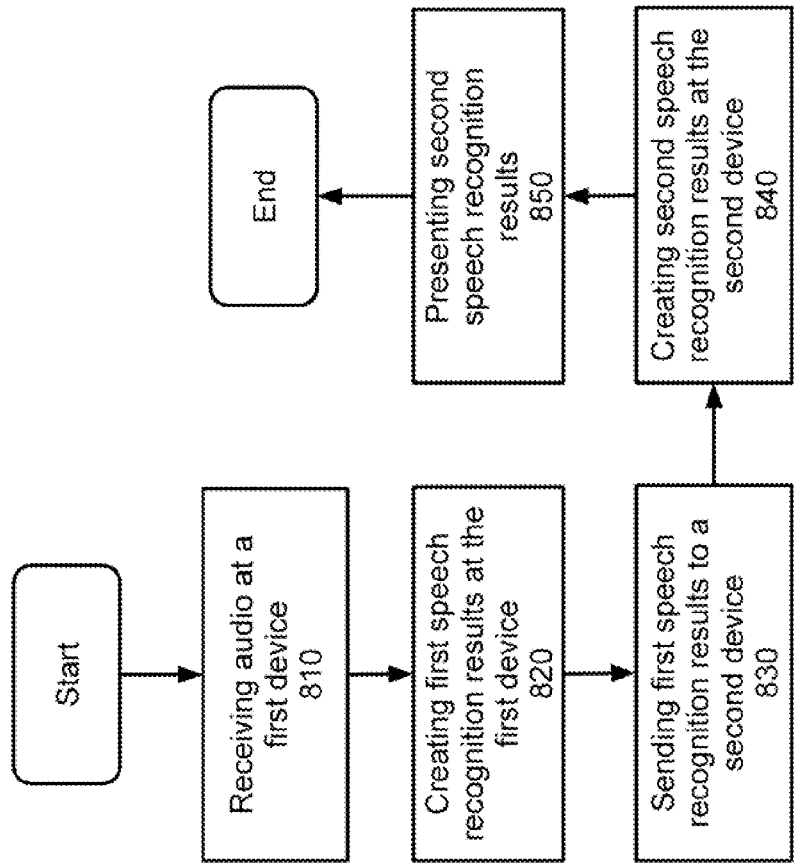
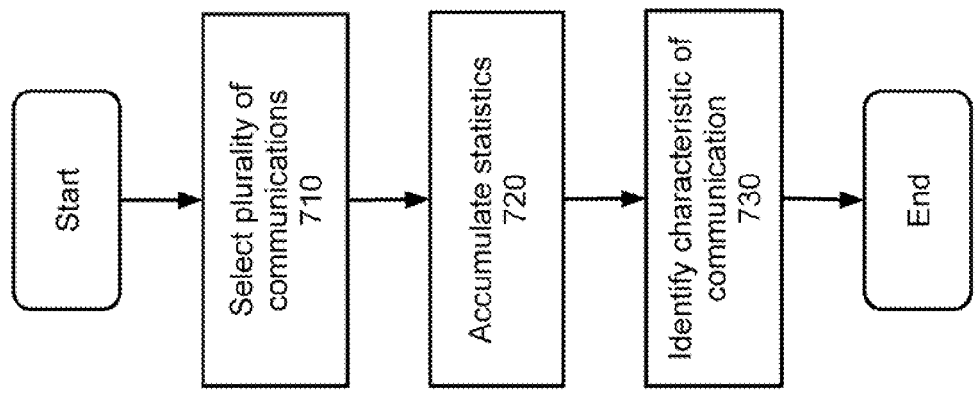

METHODS AND SYSTEMS FOR OBTAINING LANGUAGE MODELS FOR TRANSCRIBING COMMUNICATIONS

CROSS-REFERENCE TO RELATED APPLICATION

The present application is a U.S. nonprovisional patent application of, and claims priority under 35 U.S.C. §119(e) to, U.S. provisional patent application Ser. No. 61/379,781, filed Sep. 3, 2010, which provisional patent application, including its Appendix A, is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention relates generally to use a language model to improve previously-generated speech recognition results, and, in particular, to obtaining a language model, representing information stored on a device, to generate new speech recognition results based on the language model and first speech recognition results received by the device.

2. Background

Automatic Speech Recognition ("ASR") systems convert speech into text. As used herein, the term "speech recognition" refers to the process of converting a speech (audio) signal to a sequence of words or a representation thereof (text). Speech recognition applications that have emerged over the last few years include voice dialing (e.g., "Call home"), call routing (e.g., "I would like to make a collect call"), simple data entry (e.g., entering a credit card number), preparation of structured documents (e.g., a radiology report), and content-based spoken audio searching (e.g., finding a podcast where particular words were spoken).

As their accuracy has improved, ASR systems have become commonplace in recent years. For example, ASR systems have found wide application in customer service centers of companies. The customer service centers offer middleware and solutions for contact centers. For example, they answer and route calls to decrease costs for airlines, banks, etc. In order to accomplish this, companies such as IBM and Nuance create assets known as IVR (Interactive Voice Response) that answer the calls, then use an ASR system paired with text to speech (Text-To-Speech) software to decode what the caller is saying and communicate back to him. ASR may be used in desktop applications to allow users to dictate instead of type, may be used to transcribe medical reports dictated by doctors, may be used to dictate emails and text messages from mobile devices, and may be used to transcribe voicemails so that recipients may read them instead of listen to them.

In converting audio to text, ASR systems may employ models, such as an acoustic model and a language model. The acoustic model may be used to convert speech into a sequence of phonemes most likely spoken by a user. A language model may be used to find the words that most likely correspond to the phonemes. In some applications, the acoustic model and language model may be used together to transcribe speech.

One method of creating a language model is to compute probabilities that n-grams of words will occur in speech. For example, an n-gram language model may include a probability that a single word appears, that a pair of words appears, that a triple of words appears, and so forth. Other types of language models known to one of ordinary skill in the art include a structured language model and a maximum entropy language model.

Language models may be adapted to particular applications. For example, a language model for medical transcription may contain medical terms that may not appear in a language model for legal dictation. By adapting a language model to a particular application, the accuracy of the ASR system may be improved.

Language models may be combined to create a new language model. For example, a first language model might contain words that are most commonly used in every day conversation, and a second language model might contain terms particular to a specific application, such as medical phrases. By combining the general language model with a language model specific to medical terms, one may create a new language model that is suitable for transcribing medical reports, which may contain both everyday language and medical phrases.

One method for combining languages models is to interpolate between two existing language models. Another method for combining language models is to create an exponential language model (e.g., through maximum entropy) from existing language models to boost certain words or phases.

With some ASR systems, the language of the speech may be unknown. In order to perform ASR when the language of the speech is unknown, a language identification ("LID") system may be applied to estimate which language is being spoken. After the language has been determined, an ASR system may be applied that uses models for that language. A LID system may use a variety of techniques, including, for example, statistical models that classify the speech into categories. A LID system can be applied in several ways, for example, to determine whether speech is or is not a given language (e.g., English), to determine whether speech is one of two languages (e.g., English and Spanish), or to determine whether speech is one of greater number of languages.

SUMMARY OF THE PRESENT INVENTION

Applicants have appreciated that the performance of ASR systems may be improved by incorporating information into the models that is likely known by the speaker or recipient of the speech. For example, a human transcribing speech may not be able to transcribe a word that the human has never heard before, and, similarly, a computer may not be able to transcribe a word that is not included in any of the speech recognition models. By including in the speech recognition models words that are known to the speaker or recipient of speech, ASR performance may be improved.

Applicants have further appreciated that ASR performance may be improved by incorporating into the models the likelihood that a speaker or recipient would speak or hear the words. For example, a human may be more likely to transcribe the speech correctly where the words are expected rather than unexpected. A human expecting to transcribe speech relating to a baseball game may have difficulty transcribing speech relating to particle physics. Similarly, ASR may be improved where the likelihood of spoken words in the model is accurate.

Applicants have appreciated that the information known to the speaker or recipient of speech may be determined from sources outside of the speech itself. Where the speech is a voicemail message, for example, information known to the speaker or recipient may be determined from information about people (e.g., phone number, name, address) in the speaker's and/or recipient's network. Information about people in the their networks may be determined from a variety of sources, including for example caller ID records, phone company records, address books, and the Internet.

Applicants have appreciated that the likelihood that words are spoken may also be determined from various sources. For example, for a communication from one person (a sender) to another person (a recipient), there may be metadata associated with the communication that identifies the sender and recipient, and this may indicate information known by them. The content of the communication may contain information known by the participants, and this may be determined by performing ASR on the communication. The audio itself may provide further information about the participants, as the gender or age of the speakers may be determined from the audio. Further, the same information from other communications, such as other communications with a common participant, may provide further information.

Applicants have further appreciated that the performance of a LID system may be improved by using similar information. For example, where the speech is a voicemail message and the caller's area code is from a region with a higher percentage of Spanish speakers or the caller's name is Spanish, it may be more likely that the language being spoken is Spanish. Similarly, where the caller has left voicemails to others in Spanish, or the recipient has received voicemails in Spanish, it may be more likely that the language being spoken is Spanish.

Broadly defined, the present invention according to one aspect relates to a method for transcribing a communication, comprising receiving a first communication from a first sender to a first recipient; compiling information relating to a second communication from a second sender to a second recipient; using the information to obtain a language model; and using the language model to transcribe the first communication.

In a feature of this aspect of the invention, the second communication is the first communication.

In another feature of this aspect of the invention, the first communication is a phone call.

In another feature of this aspect of the invention, the first communication was not answered by the first recipient and the first sender left a voicemail message for the first recipient.

In another feature of this aspect of the invention, the first sender, the second sender, the first recipient, and the second recipient are all different people.

In another feature of this aspect of the invention, the second communication is selected based on a proximity of the second communication to the first communication in a communication graph.

In another feature of this aspect of the invention, the second communication is selected based on a relationship between the first sender and the second sender. In a further feature, the relationship is one of (i) that the first sender and the second sender are coworkers, (ii) that the first sender and the second sender are relatives; and (iii) that the first sender and the second sender are friends.

In another feature of this aspect of the invention, the second communication is selected based on a time of the second communication and a time of the first communication.

In another feature of this aspect of the invention, the information comprises information about the second sender or the second recipient.

In another feature of this aspect of the invention, the information comprises the second recipient's name.

In another feature of this aspect of the invention, the information comprises a word from a transcription of the second communication.

In another feature of this aspect of the invention, the information comprises a location of the second sender.

In another feature of this aspect of the invention, the information comprises the time and date of the second communication.

In another feature of this aspect of the invention, the information comprises information about weather.

In another feature of this aspect of the invention, the information comprises information about a news event.

In another feature of this aspect of the invention, the information comprises information about the second sender and the time and date of the second communication.

In another feature of this aspect of the invention, using the information to obtain a language model comprises obtaining a general language model; using the information to create a specific language model; and creating the language model using the general language model and the specific language model.

In another feature of this aspect of the invention, compiling information relating to the second communication comprises retrieving information from the Internet relating to the second sender or the second recipient.

In another feature of this aspect of the invention, retrieving information from the Internet comprises retrieving information from a social-networking website.

Broadly defined, the present invention according to another aspect relates to a method for determining a language spoken in a communication, comprising receiving a first communication from a first sender to a first recipient; selecting a second communication from a second sender to a second recipient; compiling information relating to the second communication; and using the information to determine the language spoken by the first sender.

In a feature of this aspect of the invention, the second communication is the first communication.

In another feature of this aspect of the invention, the first communication is a phone call.

In another feature of this aspect of the invention, the first communication was not answered by the first recipient and the first sender left a voicemail message for the first recipient.

In another feature of this aspect of the invention, the first sender, the second sender, the first recipient, and the second recipient are all different people.

In another feature of this aspect of the invention, the second communication is selected based on a proximity of the second communication to the first communication in a communication graph.

In another feature of this aspect of the invention, the second communication is selected based on a relationship between the first sender and the second sender. In a further feature, the relationship is one of (i) that the first sender and the second sender are coworkers, (ii) that the first sender and the second sender are relatives; and (iii) that the first sender and the second sender are friends.

In another feature of this aspect of the invention, the information comprises information about the second sender or the second recipient.

In another feature of this aspect of the invention, the information comprises the second sender's name.

In another feature of this aspect of the invention, the information comprises a location of the second sender.

In another feature of this aspect of the invention, compiling the information comprises compiling the language preferences of the second recipient.

In another feature of this aspect of the invention, compiling information comprises compiling the language of the second communication.

In another feature of this aspect of the invention, the information comprises second sender's name and the location of the second sender.

In another feature of this aspect of the invention, compiling information relating to the second communication comprises retrieving information from the Internet relating to the second sender or the second recipient.

In another feature of this aspect of the invention, retrieving information from the Internet comprises retrieving information from a social-networking website.

In another feature of this aspect of the invention, using the information to determine the language spoken by the first sender comprises using a Bayesian model wherein the information is used to create a prior probability for the Bayesian model.

In another feature of this aspect of the invention, compiling information relating to the second communication further comprises compiling information relating to the first communication.

Broadly defined, the present invention according to another aspect relates to a method for determining a characteristic of a communication between a first node and a second node comprising: selecting a plurality of nodes comprising the first node and the second node; accumulating statistics of a set of communications among the plurality of nodes; and identifying at least one characteristic of the communication.

In a feature of this aspect of the invention, the node is one of a phone number or an IP address.

In another feature of this aspect of the invention, the set of communications comprises all communications to or from the first node.

In another feature of this aspect of the invention, the set of communications comprises all communications among the plurality of nodes within a specified time period.

In another feature of this aspect of the invention, accumulating statistics comprises performing a graph theoretical analysis.

In another feature of this aspect of the invention, accumulating statistics comprises identifying n-cliques among the plurality of nodes.

In another feature of this aspect of the invention, the at least one characteristic relates to a frequency of communications to or from the first node and the second node.

In another feature of this aspect of the invention, the identifying the at least one characteristic comprises identifying whether the communication is a robocall, a sales call, a personal call, a business call, or an appointment reminder.

In another feature of this aspect of the invention, the invention further comprises using the at least one characteristic to obtain a language model.

In another feature of this aspect of the invention, the invention further comprises using the language model to transcribe a communication.

In another feature of this aspect of the invention, the communication is a voicemail message.

Broadly defined, the present invention according to another aspect relates to a method for transcribing a spoken communication, including: receiving a spoken first communication from a first sender to a first recipient; obtaining information relating to a second communication from a second sender to a second recipient, wherein the second communication is different from the first communication; using the obtained information to obtain a language model; and using the language model to transcribe the spoken first communication.

In a feature of this aspect, the language model is a final language model, and using the obtained information to obtain the final language model includes obtaining a general language model, using the obtained information to create a specific language model, and creating the final language model using the general language model and the specific language model.

In another feature of this aspect, the first communication is a voicemail message left by the first sender for the first recipient.

In another feature of this aspect, the first sender and the second sender are the same person.

In another feature of this aspect, the second communication is selected from a plurality of communications based on a proximity of the second communication to the first communication in a communication graph.

In another feature of this aspect, the second communication is selected from a plurality of based on a time of the second communication and a time of the first communication.

In another feature of this aspect, the method further includes using the obtained information to perform language identification.

Broadly defined, the present invention according to another aspect relates to a computer-readable medium containing a program which, when executed, performs a method that includes: receiving a spoken first communication from a first sender to a first recipient; obtaining information relating to a second communication from a second sender to a second recipient, wherein the second communication is different from the first communication; using the obtained information to obtain a language model; and using the language model to transcribe the spoken first communication.

In a feature of this aspect, the language model is a final language model, and using the obtained information to obtain the final language model includes obtaining a general language model, using the obtained information to create a specific language model, and creating the final language model using the general language model and the specific language model.

In another feature of this aspect, the second communication is selected from a plurality of communications based on a relationship between the first sender and the second sender. In a further feature, the relationship is one of (i) that the first sender and the second sender are coworkers, (ii) that the first sender and the second sender are relatives; and (iii) that the first sender and the second sender are friends.

In another feature of this aspect, the obtained information comprises information about the second sender or the second recipient.

In another feature of this aspect, the obtained information comprises a location of the second sender.

Broadly defined, the present invention according to another aspect relates to a system for transcribing a communication, including: a device, which has a memory containing a program for transcribing speech and a processor which, when executing the program, performs an operation that includes receiving a spoken first communication from a first sender to a first recipient, obtaining information relating to a second communication from a second sender to a second recipient, wherein the second communication is different from the first communication, using the obtained information to obtain a language model, and using the language model to transcribe the spoken first communication.

In a feature of this aspect, the language model is a final language model, and using the obtained information to obtain the final language model includes: obtaining a general language model, using the obtained information to create a specific language model, and creating the final language model using the general language model and the specific language model.

In another feature of this aspect, the obtained information includes the time and date of the second communication.

In another feature of this aspect, the obtained information includes information about weather.

In another feature of this aspect, the obtained information includes information about a news event.

In another feature of this aspect, the obtained information includes information about the second sender and the time and date of the second communication.

In another feature of this aspect, obtaining information relating to the second communication includes retrieving information, from the Internet, relating to the second sender or to the second recipient.

Broadly defined, the present invention according to another aspect relates to a device for transcribing a communication, including: a memory containing a program for transcribing speech; and a processor which, when executing the program, performs an operation that includes receiving a spoken first communication from a first sender to a first recipient, obtaining information relating to a second communication from a second sender to a second recipient, wherein the second communication is different from the first communication, using the obtained information to obtain a language model, and using the language model to transcribe the spoken first communication.

Broadly defined, the present invention according to another aspect relates to a method for producing speech recognition results on a device, including: receiving first speech recognition results; obtaining a language model, wherein the language model represents information stored on the device; and using the first speech recognition results and the language model to generate second speech recognition results.

In a feature of this aspect, the method further includes receiving audio, and using the first speech recognition results and the language model to generate second speech recognition results includes using the received audio to generate the second speech recognition results.

In another feature of this aspect, the method further includes receiving third speech recognition results, and using the first speech recognition results and the language model to generate second speech recognition results includes using the third speech recognition results to generate the second speech recognition results.

In another feature of this aspect, the first speech recognition results include a word lattice.

In another feature of this aspect, obtaining a language model includes creating the language model on the device, and information stored on the device includes address book information.

In another feature of this aspect, the language model is a tri-gram language model.

In another feature of this aspect, the device is a mobile phone.

In another feature of this aspect, the second speech recognition results are generated on the device.

In another feature of this aspect, the method further includes presenting the second speech recognition results on the device.

Broadly defined, the present invention according to another aspect relates to a system for producing speech recognition results on a receiving device, including: a sending device, which includes a first memory containing a first program for performing automatic speech recognition, and a first processor which, when executing the first program, performs a first operation that includes receiving audio, creating first speech recognition results using a first language model and the audio, wherein the first language model represents information stored on the sending device, and sending the first speech recognition results; and a receiving device which includes a second memory containing a second program for performing automatic speech recognition, and a second processor which, when executing the second program, performs a second operation that includes receiving first speech recognition results, and creating second speech recognition results using a second language model and the first speech recognition results, wherein the second language model represents information stored on the receiving device.

In a feature of this aspect, the first operation further includes sending the audio, wherein the second operation further includes receiving the audio and wherein creating the second speech recognition results further includes using the audio.

In another feature of this aspect, the second operation further includes receiving third speech recognition results, and wherein creating the second speech recognition results further includes using the third speech recognition results.

In another feature of this aspect, the first speech recognition results include a confusion network of speech units.

In another feature of this aspect, the first language model is created on the sending device, and wherein the information stored on the sending device includes email messages.

In another feature of this aspect, the first language model is a maximum entropy language model.

In another feature of this aspect, the sending device is a computer server.

In another feature of this aspect, the receiving device presents the second speech recognition results.

Broadly defined, the present invention according to another aspect relates to a computer-readable medium containing a program which, when executed, performs a method of producing and presenting speech recognition results, the method including: receiving first speech recognition results; obtaining a language model, wherein the language model represents information stored on the device; using the first speech recognition results and the language model to generate second speech recognition results; and presenting the second speech recognition results to a user.

In a feature of this aspect, the method performed by the program further includes receiving audio, and using the first speech recognition results and the language model to generate the second speech recognition results further includes using the received audio to generate the second speech recognition results.

In another feature of this aspect, the method performed by the program further includes receiving third speech recognition results, and using the first speech recognition results and the language model to generate the second speech recognition results further includes using the third speech recognition results to generate the second speech recognition results.

In another feature of this aspect, the first speech recognition results include a word lattice and a phone lattice.

In another feature of this aspect, obtaining a language model includes creating the language model on the device, and information stored on the device includes calendar information.

In another feature of this aspect, the language model is created by interpolating other language models.

In another feature of this aspect, the second speech recognition results are generated on the device.

In another feature of this aspect, the second speech recognition results are presented on the device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 7 is a flowchart illustrating a method for accumulating statistics of communications to determine a characteristic of a communication; and FIG. 8 is a flowchart illustrating a method for performing automatic speech recognition across two devices.

DETAILED DESCRIPTION

Figure 1:
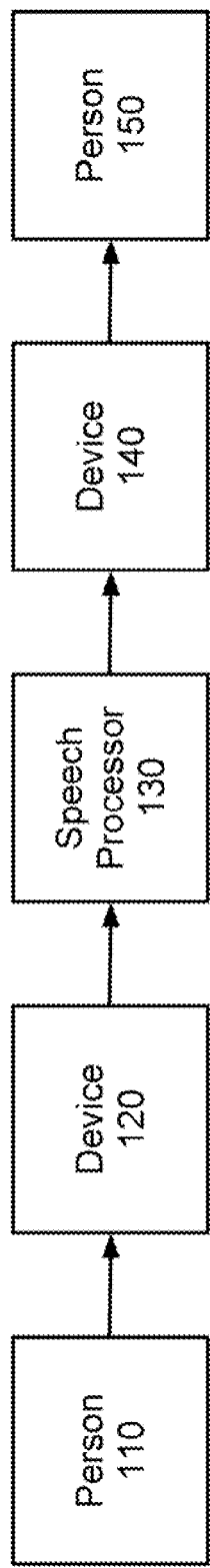
FIG. 1 is a block diagram of a system for performing ASR and/or LID in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers."Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiments is merely exemplary in nature and is in no way intended to limit the invention, its implementations, or uses.

FIG. 1 is a block diagram of a methodology for performing ASR and/or LID in accordance with one or more preferred embodiments of the present invention. A first device 120 may receive speech spoken by a person 110 or may receive speech in other ways, such as a recording of speech. The particular device is not a limiting feature of the invention and may include, for example, a mobile phone, a land-line phone, a tablet, or a computer. The device 120 may transmit the speech to a speech processor 130. The method of transmitting the speech is not a limiting feature of the invention and any methods known to one of ordinary skill in the art may be used. The speech processor 130 may process the recorded speech, for example, by performing ASR and/or LID. The speech processor 130 may use any techniques known to one of ordinary skill in the art to perform ASR or LID. The speech processor 130 may transmit recognition results to a second device 140. The recognition results may include words, tokens, a lattice, a confusion network, or any other recognition output known to one of ordinary skill in the art. The second device 140 may present the ASR results to a person 150, by presenting words on a display, using text-to-speech technology to generate audio speaking the recognition results, or any other method known to one of skill in the art.

In some embodiments, the speech processor 130 may be included within the first device 120 or the second device 140 and may not be a separate component. For example, the first device 120 or the second device 140 may be a mobile phone or a computer with speech processing technology built into the device. In some embodiments, the speech processor 130 may be a separate device, such as a server computer that is connected to the first device 120 or the second device 140 through the Internet or a telephone network. The speech processor 130 may contain any components typical of devices that perform speech processing as known by one of ordinary skill in the art. For example, the speech processor 130 may be a computer with one or more volatile and/or non-volatile computer-readable mediums, one or more processors, a display, and input devices.

In some embodiments, the first person 110 may leave a voicemail message for the second person 150. In this embodiment, the first person 110 may use the first device 120, e.g., a mobile phone, to call the second person 150, and the second person 150 may not answer the phone so that the first person 110 is forwarded to a voicemail system of the second person 150. In particular, the first person 110 may receive the voicemail greeting of the second person 150 and then speak a voicemail message into their device 120. The device 120 may transmit the audio to the speech processor 130 over a network, such as a mobile telephone network or the Internet. The speech processor 130 may perform LID and/or ASR and send ASR results to device 140. In some embodiments, the speech processor 130 may send an email or a text message to the second device 140 that includes a transcription of the voicemail message and/or the audio of the voicemail message. In some embodiments, the second device 140 may have a voicemail application that presents voicemail transcripts and audio to a user, such as the second person 150. The second person 150 may read the transcript or listen to the audio of the voicemail message using the second device 140.

In some embodiments, the first person 110 may send a text message or email to the second person 150. In this embodiment, the first person 110 may use the first device 110 to dictate an email or text message, and the device 110 may transmit the speech to the speech processor 130, which may perform LID and/or ASR. In some embodiments, the speech processor 130 may send ASR results back to the first person 110 so that that person 110 may verify and/or correct the transcription and then send the email or text message to the device 140 of the second person 150. In some embodiments, the speech processor 130 may forward the transcript and/or audio of the email or text message to the second device 140. The second person 150 may read the transcript of the email or text message or listen to the audio.

Figure 2:
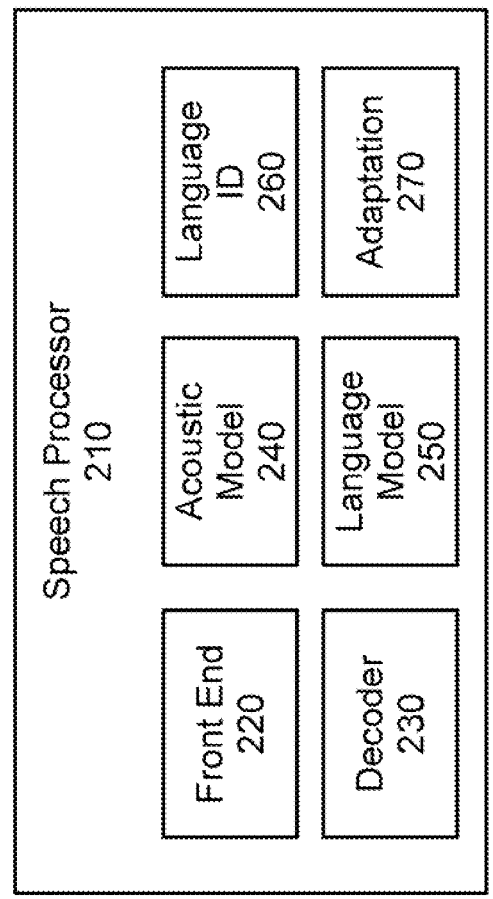
FIG. 2 is a block diagram of a speech processor that may be used in accordance with one or more preferred embodiments of the present invention.

FIG. 2 shows an example of a speech processor 210 that may be used in accordance with embodiments of the invention. The speech processor 210 may be implemented in software and/or hardware and may include any components known to a person of ordinary skill in the art. The speech processor 210 may include a front end 220 that may be used to process audio and convert the audio to feature vectors, such as MFCC (mel-frequency cepstral coefficient) vectors and/or PLP (perceptual linear prediction) vectors, and may apply other transformations such as CMS (cepstral mean subtraction), LDA (linear discriminant analysis), and/or VTLN (vocal tract length normalization).

The speech processor 210 may include one or more acoustic models 240. Any acoustic model known to one of ordinary skill may be used, such as an acoustic model that uses hidden-Markov models, Gaussian mixture models, and context-dependent phonemes. Speech processor 210 may include one or more language models 250 and language models 250 may include one or more lexicons that contain pronunciations of words. Any language model known to one of ordinary skill may be used, such as a language model that uses n-gram probabilities.

The speech processor 210 may include a decoder 230 that uses the acoustic model or models 240 and/or language model or models 250 to perform ASR on the audio. The speech processor 210 may use any techniques known to one of skill in the including, for example, a Viterbi decoder. The speech processor 210 may also apply adaptation, represented as an adaptation block 270, to improve performance of the ASR system. Any adaptation techniques known of one of ordinary skill may be used, including, for example, a feature-space maximum-likelihood linear regression.

The speech processor 210 may also include an LID block 260 to determine the language spoken in the audio. In some embodiments, the language being spoken may be unknown, and LID block 260 may process the audio to determine the language being spoken. Any method of LID known to one of skill in the art may be used, including, for example, using a stat-vector machine.

In some applications, ASR may be speaker dependent in that the speech processor knows some information about the speaker, such as statistics relating to the way that the speaker pronounces certain sounds and/or words commonly spoken by the speaker. In these situations, the speech processor may use acoustic models and/or language models that are adapted to the particular speaker. For example, where a user uses ASR on his or her home computer, the models may be adapted to that particular user.

In other applications, ASR may be speaker independent in that the speech processor does not know the identity of the speaker or it may be infeasible to have specific models for each particular speaker. For example, where ASR is used to transcribe voicemail messages, the specific identity of the speaker may be unknown (even if the phone number may be known through caller ID), or even if the identity of the speaker is known, it may be impractical to have models for every possible speaker.

Applicants have appreciated that information relating to a spoken communication may be used to improve the performance of an ASR system. In particular, applicants have appreciated that metadata relating to a communication, the words of a communication, and the audio of a communication may be used to determine information about the sender and/or recipient and that the information may be used to improve the language model used to perform ASR on the communication.

Some communications may have metadata associated with them. For example, a communication may have metadata associated with it that relates to the sender and/or recipient of the communication, the date and time of the communication, the types of devices involved in the communication (e.g., a particular brand of mobile phone), or any other appropriate metadata.

The metadata of a communication may be used to obtain information that may be used to obtain a language model to be used to transcribe the communication. For example, the metadata may be used to obtain words relevant to the communication, such as the names, addresses, and phone numbers of the participants, and these words may be added to the language model to improve the recognition of those words.

Where the metadata includes the day and time of the communication, this information may also be used to select an appropriate language model. Applicants have appreciated that the subject matter of communications may vary at different times of day, different days of the week, different days of the month, and different days of the year. For example, in the morning people may be more likely to discuss breakfast, coffee, or commuting to work, while in the evening people may be more likely to discuss plans for dinner or commuting home from work. On Sunday morning people may be more likely to discuss going to church and on Friday people may be more likely to discuss plans for the weekend. Near the end of a month, people may be more likely to discuss receiving a paycheck or having to pay a bill, while in the month of December people may be more likely to discuss winter weather or the Christmas holiday. All of this information may be used to improve language models for a particular day and/or time.

The date and time of a communication may be used in combination with the date and time of known events to obtain an appropriate language model. For example, for a time period surrounding the Super Bowl, many people may be likely to be communicating about the Super Bowl, and a language model may be obtained based on language relating to the Super Bowl. The Super Bowl language model may be combined with a general language model where each language model is given a weight. The Super Bowl language model may be given a lower weight a week before the Super Bowl and be given a higher weight on the day of the Super Bowl. Additionally, the weight of the Super Bowl language model may depend on other information, such as the gender of the person since men may be more likely to talk about the Super Bowl than women.

In some embodiments, the metadata may contain other information about the participants, such as their ages, gender, educational level, political persuasion, preferred languages, and birthplace. This metadata may be used to select an appropriate language model to transcribe the communication. The metadata may be used singly or in combination. For example, the gender of the speaker could be used to choose from one of two language models. Alternatively, one could use more metadata to select a language model that is appropriate for a 40 year-old male Democrat with a college degree speaking to a 50 year-old female Republican with a high-school education.

In some embodiments, the metadata may be used to determine other information about the participants to the communication. For example, the name of a participant may be used to estimate his or her gender and age. Where a participant is named Mabel, that participant may be more likely to be an older woman. In another example, the type of device used to communicate may provide information about a participant. Certain devices may be popular among teenagers while other devices may be more popular with business people.

In some embodiments, the metadata may be used to retrieve other information about the participants. For example, an address of a participant could be used to retrieve information about street names, businesses, weather, or other information close to an address. A person's name could be used to retrieve information about the person, such as email messages to or from the person, postings by the person on the Internet (such as a blog), or postings by the person to a social networking site (such as Facebook). All of this information could be used to improve a language model and improve ASR accuracy for communications to or from the person.

The recognized text of a communication may be used to determine further information about a communication, which may be used to obtain an appropriate language model and then perform ASR a second time on the same communication. For example, the person may speak the name of the sender or the recipient. The names of the sender and/or recipient may be used to add information to a language model, such as the names themselves or the addresses and phone numbers of the participants. Further, information retrieved from the text of the communication may be used to determine other information about the participants (e.g., determining gender from the name) and may be used retrieve information from other sources (e.g., the Internet), as described above.

In some embodiments, natural language processing may be used to identify relevant words spoken in a communication. For example, natural language processing may be used to determine whether a spoken name is the name of the sender, the recipient, or a third party as the role of the person's name may impact how a language model is obtained using that name. In some embodiments, the language model may be obtained using the sender's name while in other embodiments, it may be obtained using the recipient's name.

The audio of a communication may also be used to determine information about the communication. For example, the audio of a communication may be processed to determine the gender of the speaker, and once the gender of the speaker is known, the gender may be used to select an appropriate language model. Techniques for determining information about a speaker from audio are known to one of ordinary skill in the art, including, for example, techniques for determining the gender, age, emotion, accent, acoustic environment (e.g., speaking while riding in a car), or educational level of the speaker. Any of this information may be used alone or in combination to obtain an appropriate language model.

All of the foregoing techniques may be used in combination to obtain a language model for performing ASR on a communication. First, for a particular communication, direct information relating to the communication may be determined using the metadata, processing the audio to determine characteristics of the speaker (e.g., age or gender), and performing a first-pass of ASR on the audio to determine the words that were spoken. Second, this direct information, either individually or in combination, may be used to determine indirect information from the direct information, such as determining the gender of a person from his or her name. Third the direct information and/or indirect information may be used to retrieve tertiary information related to a communication, for example using the Internet or available databases.

All of the foregoing information relating to a communication may be used to obtain an appropriate language model for ASR of the communication. In some embodiments, the information may be used to identify relevant words, and the relevant words may be added to a language model or have increased weight in a language model. In some embodiments, a specified number of language models may be available, and the information may be used to select a language model from this set that is most appropriate. In some embodiments, a language model may be obtained by combining a number of existing language models, and the information may be used to determine the weight to apply to each of the language models being combined. In some embodiments, a language model may be obtained by creating a class language model. In some embodiments, other communications may be obtained that contain similar information, and a language model may be created using those other communications. Obtaining a language model may also include obtaining a lexicon or modifying an existing lexicon. Modifying a lexicon may include adding or deleting words; modifying, adding, or deleting pronunciations; and modifying the probabilities of pronunciations. The particular information used to obtain a language model and the method of obtaining a language model is not a limiting feature of the invention.

Applicants have further appreciated that information relating to a communication can be derived from using other communications. For example, information relating to a first communication from a particular sender to a particular recipient may be derived from (1) other communications from that sender, (2) other communications to that recipient, or (3) any other communication that has a common element with that first communication. Information from these other communications may be combined with information from the first communication to obtain a language model for performing ASR.

Any of the foregoing techniques may be applied to the other communications. For example, direct information from metadata, audio, and recognized text of the other communications may be used to obtain a language model. Further, this direct information from other communications may be used to determine indirect information or retrieve tertiary information from other sources, as described above.

Figure 3:
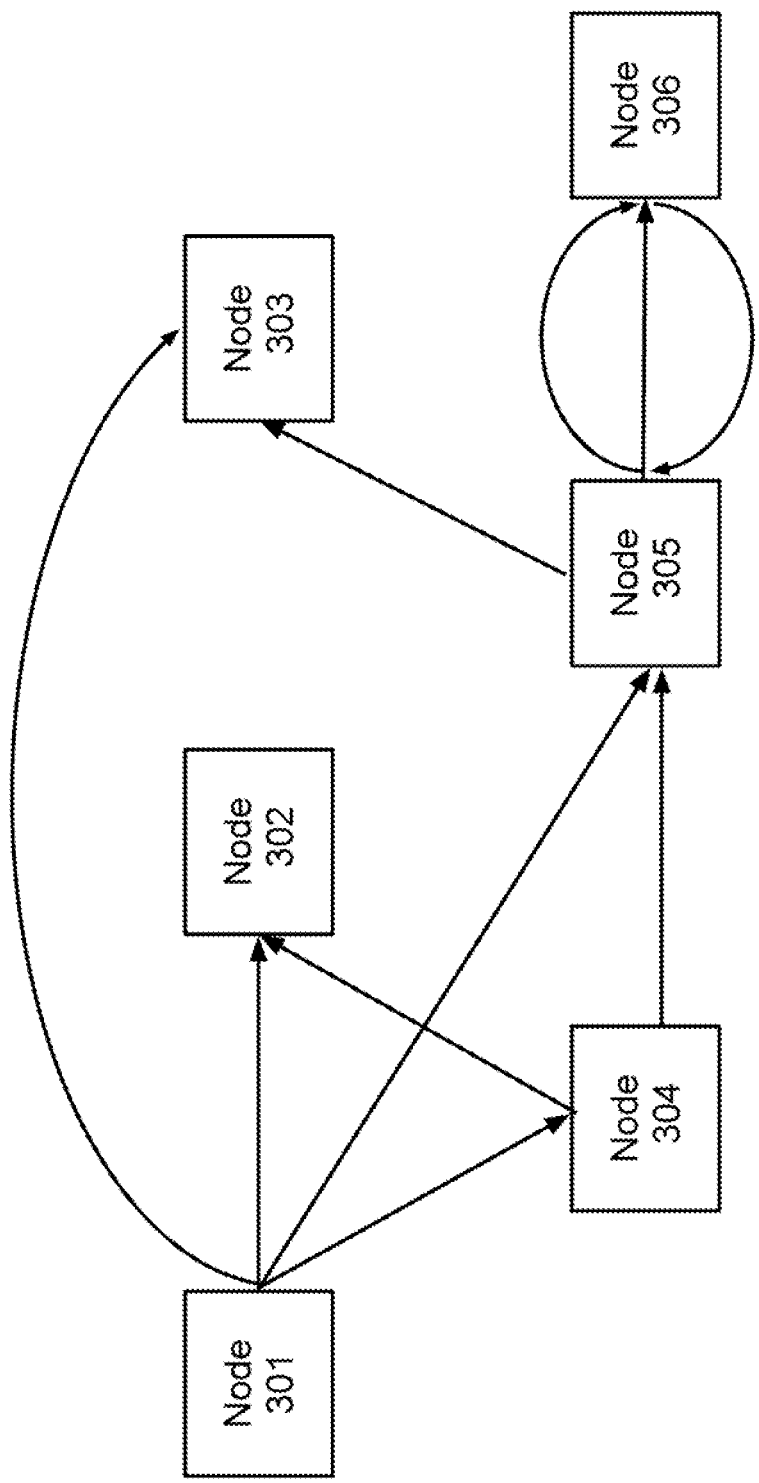
FIG. 3 shows an example of a call graph that may be used in accordance with one or more preferred embodiments of the present invention.

FIG. 3 shows an example of a graph of a communications network. In this graph, each node may represent a person or device that is communicating with another person or device, and each edge between two nodes may represent a communication. The edges may further have a direction and may thereby indicate the direction of the communication. In some embodiments, the communications network may be a telephone network, a node may represent a person or a phone number, and an arrow may represent a telephone call. The communications network could be a computer network, a node may represent a person, a computer, or an IP address, and an arrow may represent a dictated email.

The number and direction of communications may be used to determine information about nodes and communications. For example, in FIG. 3, node 301 has sent a communication to node 302, node 303, node 304, node 305, and node 306, but node 301 has not received any communications from other nodes. In some embodiments, this may indicate that node 301 is a certain type of node. For example, for a telephone network, node 301 may belong to an entity that employs robocalls to communicate with a large number of people. A robocall may be a phone call that is placed automatically, for example by a computer, and which may contain a pre-recorded message or a message generated by a computer. Since many of the robocalls may be identical, or nearly identical, this information may be used to improve ASR performance. In some embodiments, where it may be determined that robocalls are identical, one transcript may be used, thereby avoiding the need to perform ASR. In some embodiments, transcriptions from other robocalls may be used to improve the language model for a particular robocall.

In FIG. 3, there are several communications between node 305 and node 306. Such communications may indicate that there is a relationship between the two nodes. For example, people communicating from these two nodes may be family members, coworkers, or friends. Since people in a relationship may communicate about similar or related topics in different communications, transcriptions of other communications may be used to improve the language model for a particular communication. The same principle may be applied to a clique of nodes in a communications network. For example, where there is a set of n-nodes in a graph where each of the n nodes is connected to at least m nodes in the set, this set of nodes may be referred to an n-clique. In some embodiments, an n-clique may indicate a relationship among the nodes in the n-clique.

Previous communications to or from a person may be used to obtain information regarding future events for that person, and that information may be used to obtain a language model for future communications to or from that person. For example, where one person calls another person to schedule dinner on Saturday at 6:00 P.M. at a particular restaurant, that information may be extracted from the transcript of the call, for example, by using natural language processing. This information may be used to obtain a language models for other calls to or from those people, especially for calls close the to date and time of the event.

Information about other communications may used to improve ASR even where the other communication is among different people than the current communication. For example, in FIG. 3, there is a communication from node 304 to node 302 and another communication from node 305 to node 303. Although these communications are among four different nodes, the communications are close to one another on the graph since node 304 has communicated with node 305. Since the two communications are close to each other in the graph, it may be more likely that the two communications have similar subject matter. Whether another communication may be used to improve ASR for a particular communication, may therefore depend on the proximity of the two communications in the graph.

The timing and relationship of nodes may also indicate that communications are related to one another. For example, where a number of persons engage in a phone tree. In a phone tree, one person may call a number of other persons to relay a message. Each of these other persons may call a number of other persons to relay the same message, and so forth. Since these communications may occur at approximately the same time and among persons who are connected on the call graph, it may be determined that these communications contain similar content, and this information may be used to obtain an appropriate language model.

In some embodiments, other communications that are close in time to the current communication may be used to improve ASR for the current communication. For example, where a significant event, such as a news event or a natural disaster, occurs there may be many people communicating about the same subject at the same time. Communications close in time to one another may be used to improve a language model for all of the communications.

In some embodiments, a language model may be obtained by collecting calls containing similar information. For example, it may be determined that a particular communication is a phone call from a dentist office reminding a person of an upcoming dentist appointment. Other communications may be identified where a dentist office (either the same one or a different one) is reminding people of upcoming appointments, and these communications may be used to construct an appropriate language model. In another example, it may be determined that a particular communication is from a college student on a Friday evening, and a language model may be created using other communications from college students from the same college on a Friday night.

As discussed above, the day and time of a communication may indicate the likely content of a communication. Applicants have appreciated that one can create a language model that is particular to a day and a time by combining language models that are adapted to different days and times. For example, one could create six time language models for the time ranges midnight to 4 A.M., 4 A.M. to 8 A.M., 8 A.M. to noon, noon to 4 P.M., 4 P.M. to 8 P.M., and 8 P.M. to midnight. These language models could be created by using information from other communications at these respective times. Similarly, one can create language models for each day of the week, each day of the month, and each day of the year. In some embodiments, to create a language model for a particular day and time, for example Monday May 24 at 10:30 A.M., one can combine language models for 8 A.M. to noon, Monday, the $24^{th}$ day of the month, and the $144^{th}$ day of the year. In some embodiments, one could create a language model for a particular day and time by interpolating all of the existing language models and minimizing the perplexity using a development set of data.

Figure 4:
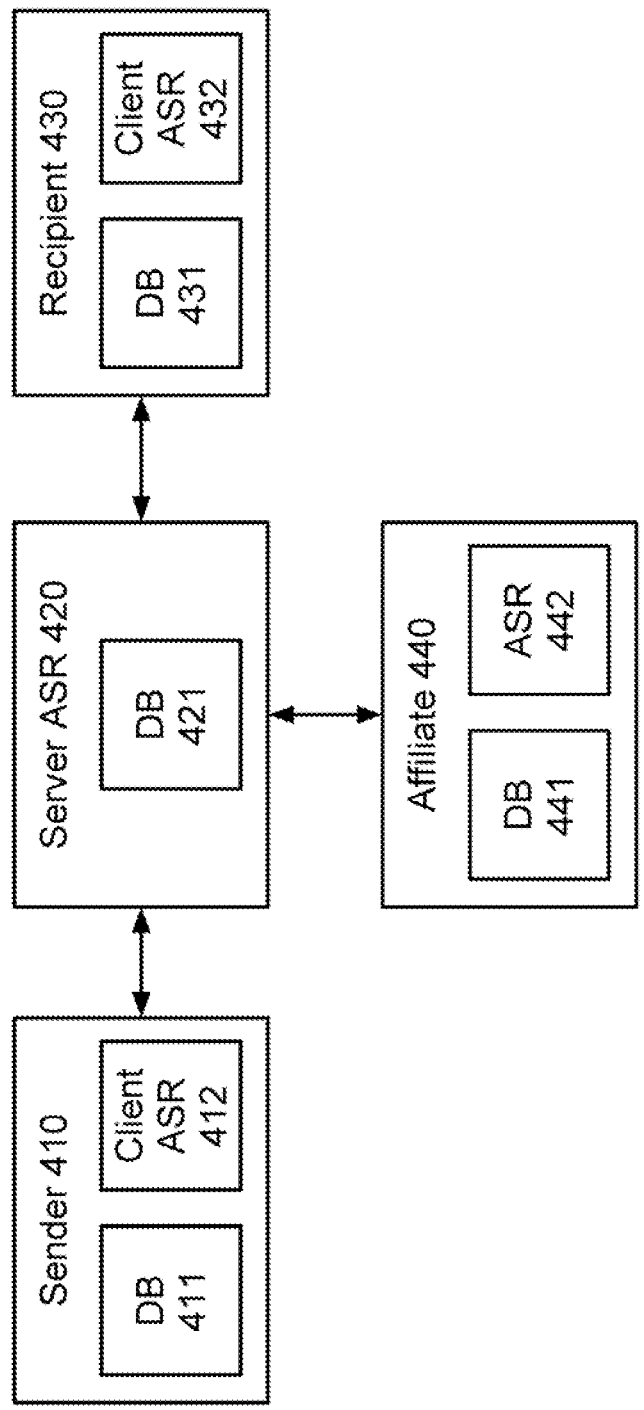
FIG. 4 is a block diagram of an exemplary system for retrieving relevant information for performing speech recognition in accordance with one or more preferred embodiments of the present invention.

FIG. 4 shows an example of a system for retrieving relevant information for performing speech recognition in accordance one more embodiments of the invention. FIG. 4 includes a sender 410 who may be sending a communication to a recipient 430 and the communication may be transcribed with the assistance of a server ASR 420 and/or an affiliate 440.

The sender 410 is a device that allows a user to send a communication. The sender 410 may be any communication device known to one of ordinary skill in the art, including but not limited to a land line phone, a mobile phone, a smart phone, a tablet, or a computer. In some embodiments, the sender 410 may have information on the device relating to the user sending the communication, such as an address book, a calendar with appointments, a list of sent and received communications, email messages, text messages, transcribed phone calls, current time, and current location.

The information stored on sender 410 may be stored in a database ("DB") 411. As used herein, "database" or "DB" generally describes any method of storing information on a device that is known to one of skill in the art and is not limited to any particular method of storing information, such as a relational database. The DB 411 may include storing information on a smart phone (such as an Apple iPhone or an Android phone) in the manner allowed by the manufacturer of the smart phone. The DB 411 may also include compiling information available on the sender 410 and storing that information in a particular format, such as an ARPA format language model file.

In some embodiments, the sender 410 may also include a client ASR 412, which may be software and/or hardware for performing automatic speech recognition on sender 410. The client ASR 412 may include any methods for performing speech recognition known to one of ordinary skill in the art, including but not limited to the methods described above. In some embodiments, the sender 410 may periodically scan information on the sender 410 and format the information in DB 411 to make it easier for the client ASR 412 to perform speech recognition. The DB 411 may also store other information that may be useful in performing ASR, such as information relating to current events, breaking news stories, the current weather, the time of day, the day of the week, the day of the month, and the day of the year.

In some embodiments, the sender 410 may send only the audio of the communication. In some embodiments, the sender 410 may send metadata relating to the audio. The metadata relating to the audio may include information that relates to the sender and/or recipient of the communication, the date and time of the communication, the types of devices involved in the communication (e.g., a particular brand of mobile phone), or any other appropriate metadata. In some embodiments, the sender 410 may send speech recognition results that were computed using client ASR 412. In some embodiments, the sender 410 may send information from the DB 411.

In some embodiments, the sender 410 may not share any information in the DB 411 when sending a communication. This may be because the sender 410 does not have any stored information, it does not have the capability to share stored information, or the user chooses not to share stored information, such as for privacy reasons.

Where the sender 410 does not have a DB 411 or does not share information from such DB 411, the communication sent from the sender 410 may include some information in addition to or instead of the audio of the communication. In some embodiments, sender 410 may perform ASR using client ASR 412 and include speech recognition results along with or instead of the audio. The client ASR 412 may perform ASR by using information in the DB 411 to create a new language model or to modify an existing language model. The speech recognition results may be sent to the recipient 430 or may be further processed by third parties, such as a server ASR 420.

Where the sender 410 includes speech recognition results with the audio, those results may be in any format known to one of skill in the art, such as a top-N list of recognized words, a top-N list of recognized utterances (as a sequence of words, phones, or other speech units), a lattice (of words, phones, or other speech units), or a confusion network (of words, phones, or other speech units). Speech recognition results may also include any combination of the foregoing, such as a lattice of words and a lattice of speech units. In some embodiments, third parties may refine the speech recognition results using the audio and the speech recognition results provided by the client ASR 412. In this manner, the sender 410 may use the information in DB 411 to improve speech recognition results without sharing the information in DB 411 with others.

In some embodiments, the sender 410 may use the DB 411 for recognizing out-of-vocabulary (OOV) words. The client ASR 412 may have a limited vocabulary of words that it is able to recognize. Where a word is spoken that is not in the vocabulary of the client ASR 412, that word may be an OOV word. The client ASR 412 may estimate how an OOV word, such as a person's name from an address book, is pronounced and add the OOV word to its vocabulary or be able to recognize the OOV word using the estimated pronunciations without adding them to the vocabulary.

In some embodiments, the sender 410 may share information in the DB 411 with third parties who may use the information to perform ASR. For example, the sender 410 may share information from the DB 411 with the server 420, the recipient 430, or the affiliate 440. In some embodiments, the sender 410 may provide information from the DB 411 along with audio. In some embodiments, third parties may request that the sender 410 provide information from the DB 411 after receiving audio from the sender 410. In some embodiments, the sender 410 may authorize one third party to retrieve information from another third party. For example, the sender 410 may authorize the server ASR 420 to retrieve information from the affiliate 440, where the affiliate 440 stores email messages for the sender 410.

The server ASR 420 may receive a communication from the sender 410, transcribe the communication using automatic speech recognition, and send the transcribed communication to the recipient 430. The server ASR 420 may include a DB 421 that may contain information that is helpful for performing ASR. For example, the server DB 421 may store information about other communications, such as some or all communications previously processed by the server ASR 420. This information may include for each communication, the audio, the sender, the date and time of the communication, the recipient, locations of the sender and recipient, a transcription of the communication, and any other relevant information or metadata.

The server DB 421 may also store other information about senders and recipients of communications. For example, the sender and the recipient may authorize the server ASR 420 to obtain information stored on devices such as the sender 410 and/or the recipient 430, to obtain information from the personal email accounts of senders and recipients, or to obtain any other information about senders and recipients that may be useful in performing ASR. The DB 421 may also store other information that may be useful in performing ASR, such as information relating to current events, breaking news stories, the current weather, the time of day, the day of the week, the day of the month, and the day of the year. The server ASR 420 may use the information in the DB 441 to create a new language model or modify an existing language model in performing ASR. The server ASR 420 may also use the available information for recognizing OOV words.

In some embodiments, the server ASR 420 may not store all information in the DB 421 that may be available for performing ASR. Instead, the server ASR 420 may retrieve some information from other sources at the time that it is needed. For example, where the server ASR 420 has the authority to use the email of the sender 410, the server ASR 410 may retrieve the relevant emails from the affiliate 440 after receiving a communication from the sender 410. In another example, the server ASR 420 may receive a communication from the sender 410 and then request information from one or more social networking sites such as Facebook, Twitter, or LinkedIn, and then use this information in performing ASR. In some embodiments, the server ASR 420 may request information from the sender 410.

In some embodiments, the server ASR 420 may also communicate with the affiliate 440. The affiliate 440 may include a DB 441 that may include any of the information stored in the server DB 421. The affiliate 440 may also include an ASR 442. In some embodiments, affiliate may not share some or all of the information in the affiliate DB 441. For example, the affiliate DB 441 may contain sensitive information such as health records or credit card numbers. The affiliate 440 may receive information from the server ASR 420 and use that information to perform ASR using information from the affiliate DB 441 and the affiliate ASR 442. For example, the affiliate 440 may receive the audio and perform ASR on the audio after creating an appropriate language model using information from its DB 441. The affiliate 440 may receive other information instead of or in addition to the audio, such as speech recognition results (e.g., in a top-N, lattice, or confusion network format) or information from another database, such as the server DB 421 or the sender DB 411. In some embodiments, the affiliate 440 may also return speech recognition results, such as a top-N list, lattice, confusion network, or the like.

In some embodiments, the server ASR 420 may combine speech recognition results from multiple sources to produce updated speech recognition results. For example, the server ASR 420 may receive speech recognition results from the sender 410 and/or the affiliate 440. In some embodiments, the server ASR 420 may produce its own speech recognition results and then use its own speech recognition results in combination with speech recognition results from the sender 410 and/or the affiliate 440 to produce updated speech recognition results. In some embodiments, server ASR 420 may use speech recognition results from sender 410 and/or affiliate 440 to modify its models and then use the modified models to produce updated speech recognition results.

The recipient 430 is a device that allows a user to receive a communication. The recipient 430 may be or include any of the devices described for the sender 410. In some embodiments, the recipient 430 may also have information about the user receiving the communication as that is similar to information the sender 410 may include about the user sending the communication, and the information stored on the recipient 430 may be stored in a DB (database) 431. In some embodiments, the recipient 430 may include a client ASR 432 with features similar to those of the client ASR 412.

In some embodiments, the recipient 430 may receive only the audio of the communication. In some embodiments, the recipient 430 may receive metadata relating to the audio, as described above. In some embodiments, the recipient 430 may receive speech recognition results that were computed by a third party, such as the sender 410, the server ASR 420, or he affiliate 440. In some embodiments, the recipient 430 may receive information relevant to performing speech recognition from a third party, such as information from the sender DB 411, the server DB 421, or the affiliate DB 441. In some embodiments, the recipient 430 may request information from third parties, such as information from the sender DB 411, the server DB 421, or the affiliate DB 441.

Where the recipient 430 receives the audio, the recipient 430 may perform speech recognition on the audio to generate speech recognition results. In some embodiments, the recipient 430 may periodically scan information on the recipient 430 and format the information in its DB 431 to make it easier for the recipient's client ASR 432 to perform speech recognition. The recipient DB 431 may also store other information that may be useful in performing ASR, such as information relating to current events, breaking news stories, the current weather, the time of day, the day of the week, the day of the month, and the day of the year. The client ASR 432 may perform ASR by using information in the recipient DB 431 to create a new language model or to modify an existing language model. The recipient 430 may also use the available information for recognizing OOV words.

In some embodiments, the recipient 430 may combine speech recognition results (e.g., a top-N list, lattice, confusion network, or the like) from multiple sources to produce updated speech recognition results. For example, the recipient 430 may receive speech recognition results from the sender 410, the server ASR 420 and/or the affiliate 440. In some embodiments, the recipient 430 may produce its own speech recognition results and then use its own speech recognition results in combination with speech recognition results from the sender 410, the server ASR 420 and/or the affiliate 440 to produce updated speech recognition results. In some embodiments, the recipient 430 may use speech recognition results from the sender 410 and/or the affiliate 440 to modify its models and then use the modified models to produce updated speech recognition results. The recipient 430 may, for example, perform post-processing on received speech recognition results to improve accuracy, such as through a language-model rescoring. In some embodiments, the recipient 430 may not receive audio or may not perform ASR on received audio, and instead may use received speech recognition results and information in the recipient DB 431 to create updated speech recognition results.

In some embodiments, recognition results may be combined from two or more sources. For example, the sender 410 may perform ASR using the sender client ASR 412 and DB 411 to create first recognition results. The sender 410 may send the audio and first recognition results to the server ASR 420, and the server ASR 420 may use the first recognition results and its own DB 421 to create second recognition results using any methods known to one of skill in the art. Further, the server ASR 420 may send the audio and second recognition results (and optionally the first recognition results) to the recipient 430, and the recipient 430 may use the second recognition results (and optionally the first recognition results), the recipient DB 431 and the recipient client ASR 432 to create final recognition results using any methods known to one of skill in the art. The recipient 430 may display final recognition results to a user of the recipient 430.

The foregoing system provides improved ASR accuracy by using available information to train the models used in ASR. Information relating to the sender of the communication, information relating to the recipient of the communication, and other information (such as time, date, weather, current events, etc.) may all be used to create or modify language models to be used with ASR. The foregoing system may allow users to maintain their privacy while also allowing their information to be used in performing ASR by performing all or some aspects of the ASR on their own device.

Figure 5:
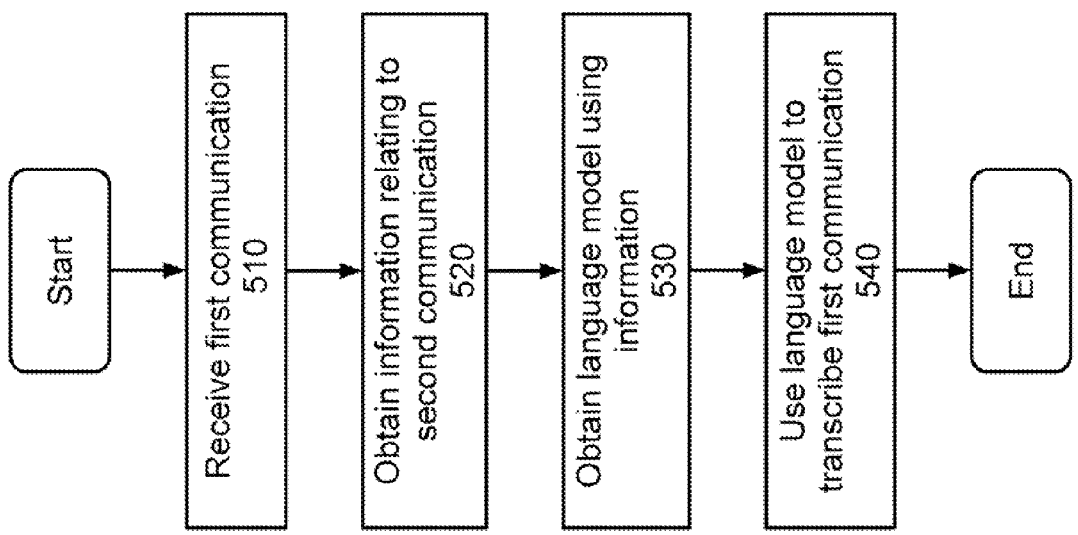
FIG. 5 is a flowchart illustrating a method for using information relating to a communication to improve the ASR accuracy in transcribing a communication.

FIG. 5 is a flowchart illustrating a method for using information relating to communications to improve the ASR accuracy in transcribing a communication. The method starts at act 510 where a first communication from a sender to a recipient is received. Any type of communication may be received, and the particular type of communication is not a limiting feature of the invention. The communication may be live or recorded. For example, the communication could be a live phone call, a recorded phone call, a live dictated email or text message, or a recorded dictated email or text message.

The method proceeds to act 520 where information relating to a second communication from a second sender to a second recipient is obtained. One or more of the second communication, the second sender, and the second recipient may be the same as the first communication, the first sender, and the first recipient, respectively, or may be different. The second communication may have occurred at an earlier time or may have occurred at a later time than the first communication.

The information relating to a particular communication may include information about the sender of the communication, the recipient of the communication, the communication itself, the network or networks used by the communication, or any other relevant information. The types of information obtained are not a limiting feature of the invention. For example, the obtained information may include any information referred to above as well as routing information of the communication or the status of the network at the time of the communication. The obtained information may be obtained directly or indirectly from the communication. For example, the communication itself may include information such as the phone number of the sender or recipient, and information may be retrieved in other ways, such as retrieving information from a caller ID service or using the Internet.

The method proceeds to act 530 where a language model is obtained using the obtained information relating to the second communication. Any suitable method for obtaining a language model may be used, including but not limited to any of the following: retrieving relevant words using the information and adding them to an existing language model, selecting one language model from a set of language models based on the information, or creating a specific language model using the information and combining the specific language model with another language model.

The method proceeds to act 540 where the language model is used to transcribe the first communication. Any suitable method may be used to transcribe the first communication, such as applying an ASR system known to one of ordinary skill in the art using the obtained language model.

Applicants have further appreciated that in some applications where the language spoken by the speaker is not known, the performance of a LID system may be improved by using information related to a communication. LID systems may use similar components as an ASR system. For example, a LID system may use a front-end component and an acoustic modeling component. The LID system may be implemented in any suitable way, including for example using a maximum likelihood estimate or a Bayesian estimate that is based on a prior probability that a communication is in a certain language.

Applicants have further appreciated that metadata relating to a communication may be used to improve the performance of a LID system. For example, where the metadata indicates that the name of the sender or the recipient is a common Spanish name (e.g., Miguel) or the phone number of the sender or recipient is from an area with a relatively high proportion of Spanish speakers, it may be more likely that a communication is in Spanish rather than English. In some embodiments, the metadata may indicate the language preferences of the sender or recipient. For example, where the network is a telephone network, the user may be able to set a preference to receive recorded messages in a specified language. Where such information is available, it may improve the performance of a LID system.

The metadata may also be used to retrieve other information from the Internet or available databases to determine what language is spoken. For example, where the sender of a communication typically posts messages on the Internet in Spanish, the sender may be more likely to speak Spanish.

Information about other communications may also be used to improve the performance of a LID system. A communications graph may be used to determine information about whether a particular communication is in a particular language. For example, where a node has frequent communications with other nodes and it is known that the other nodes are likely to communicate in a particular language (via a name, phone number, actual LID estimate, or other information) it may be more likely that communications with that node are in that particular language.

As described above, the proximity of communications in a graph, frequent calls between two nodes indicating a relationship between them, information extracted from other sources (such as a blog or a social networking web site), or the presence of n-cliques may also be used to determine whether a communication is in a particular language.

The system of FIG. 4 may also be used for language identification. For each of the sender 410, the server ASR 420, the recipient 430, and the affiliate 440, a LID system may be incorporated into the sender client ASR 412, the server ASR 420, the affiliate ASR 432, and the recipient client ASR 442, respectively. The same techniques that may be applied for performing ASR using the relevant information may also be applied in the same way to perform language identification.

Figure 6:
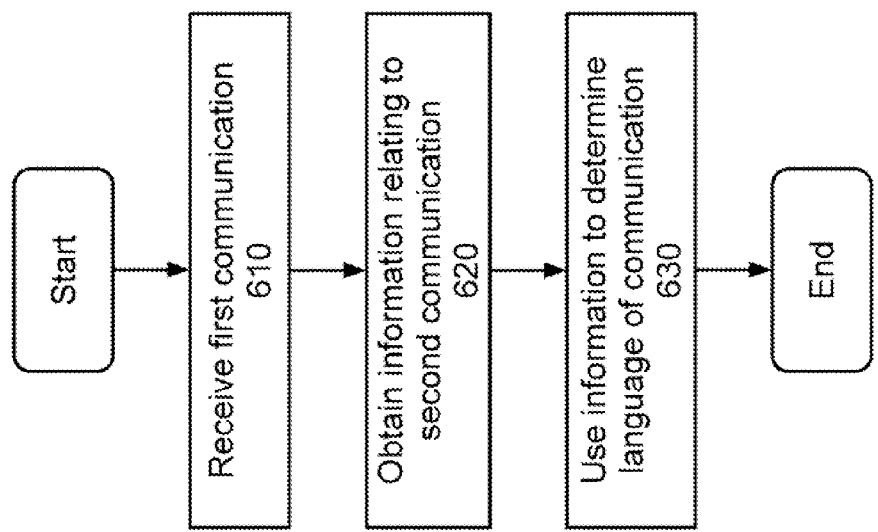
FIG. 6 is a flowchart illustrating a method for obtaining and using information relating to a communication to improve the accuracy of a LID system.

FIG. 6 is a flowchart illustrating a method for obtaining and using information relating to a communication to improve the accuracy of a LID system. The method starts at act 610 where a first communication from a sender to a recipient is received. Any type of communication may be received, and the particular type of communication is not a limiting feature of the invention. The communication may be live or recorded. For example, the communication could be a live phone call, a recorded phone call, a live dictated email or text message, or a recorded dictated email or text message.

The method proceeds to act 620 where information relating to a second communication from a second sender to a second recipient is obtained. One or more of the second communication, the second sender, and the second recipient may be the same as the first communication, the first sender, and the first recipient, respectively, or may be different. The second communication may have occurred at an earlier time or may have occurred at a later time than the first communication.

The information relating to the second communication may include information about the sender of the communication, the recipient of the communication, the communication itself, the network or networks used by the communication, or any other information. The types of information obtained are not a limiting feature of the invention. For example, the obtained information may include any information referred to above as well as routing information of the communication or the status of the network at the time of the communication. The obtained information may be obtained directly or indirectly from the communication. For example, the metadata itself may include information such as the phone number of the sender or recipient, and information may be retrieved in other ways, such as retrieving information from a caller ID service or using the Internet.

The method proceeds to act 630 where a LID system is used to determine the language of the first communication. A LID system may employ Bayesian estimate by using the information to create or modify a prior probability for determining whether a communication is in a particular language. For purposes of illustration, suppose that 10% of the people in the United States speak Spanish as their first language, but in Miami 50% of the people speak Spanish as their first language. The default prior estimate could be based on the nationwide 10% number, but where a communication is to or from Miami the prior could be based on the 50% number.

Applicants have further appreciated that characteristics of communications, senders, and recipients may be determined by accumulating information about communications. As explained above, one can create a communications graph where the nodes are the senders and recipients and the edges are the communications. One can create such a graph by using any number of nodes and any number of communications. For example, one could use all available nodes and communications or choose any appropriate subset of each.

Any suitable methods of graph theoretic analysis may be used. For example, a graph or a subset of a graph can be modeled or represented using an adjacency matrix. Eigenvectors and eigenvalues can be determined from the adjacency matrix to analyze relationships between the nodes of the graph. Other analysis tools include determining the maximum average degree of a graph and the number of triangles in a graph.

For example, one could consider the rate of communications to or from a particular node. Where a node has many outgoing communications and few incoming communications, the node could correspond to a robocaller or an email spammer. Where a node only has communications during business hours, the node may correspond to a business.

The rate of communications among a certain number of nodes may also indicate a relationship among the nodes. For example, where an n-clique of nodes exists, the nodes may correspond to a group of friends, family members, or coworkers.

In some embodiments, the call graph may be combined with external information to determine information about the nodes. For example, geographic or socioeconomic information may be available about some nodes but not other nodes. Where nodes are likely to have similar characteristics, this information may be used to estimate information about other nodes.

FIG. 7 is a flowchart illustrating a method for accumulating statistics of communications to determine a characteristic of a communication. The method starts at act 710 where a plurality of communications is selected based on the first communication. Any suitable method of selecting the plurality of communications may be used, and the method for selecting the communications is not a limiting feature of the invention. For example, the communications selected could be communications to or from a particular person, communications over a specified time, communications among a group of related people, or communications having a common element, such as the age of the person.

The method proceeds to act 720 where statistics are accumulated concerning the selected communications. Any method for accumulating statistics may be used, and the particular method for collecting statistics is not a limiting feature of the invention. For example, information relating to each selected communication may be obtained and that information may be used to cluster the persons into different categories, natural language processing may be performed to determine the most common subject matters of the communications, or graph theoretic analysis may be applied to determine relationships between the people.

The method proceeds to act 730 where a characteristic of the first communication is identified. The characteristic identified and the method for identifying it are not limiting features of the invention. For example, the characteristic may be that the recipient of the first communication is a coworker of a set of other persons, that the sender of the first communication is in a certain socio-economic category, or that the recipient's first language is Spanish.

FIG. 8 is a flowchart illustrating a method for performing automatic speech recognition across two devices. The method starts at act 810 where audio is received at a first device. The first device may be any suitable device, including but not limited to a server computer, a land line phone, a mobile phone, a tablet, or a personal computer. The audio may be spoken by a person, may be received on a computer readable medium, or may be received over a computer network, such as the Internet. For example, the communication could be a live phone call, a recorded phone call, a live dictated email or text message, or a recorded dictated email or text message.

The method proceeds to act 820 where first speech recognition results are created on the first device using automatic speech recognition software and/or hardware. The automatic speech recognition may be performed using any techniques known to one of skill in the art. The automatic speech recognition may use a language model, and the language model may be created using information stored on the first device, such as any of the information described above. In some embodiments, the language model may be created on the device and may be periodically updated as the information on the device changes and/or may be created by interpolating other language models. Any suitable language model may be used, such as a tri-gram language model, and the invention is not limited to any particular language model.

The method proceeds to act 830 where the first speech recognition results are sent from the first device to a second device. In some embodiments, the speech recognition results may be accompanied by the audio and/or metadata relating to the audio. The first speech recognition results may be sent by any means known to one of skill in the art, including a computer network. The first speech recognition results need not be sent directly to the second device, and may be sent via other devices and the other devices may perform additional processing on the first speech recognition results.

The method proceeds to act 840 where second speech recognition results are created on the second device using the first speech recognition results and automatic speech recognition software and/or hardware. The second device may be any suitable device, including those described with regard to the first device, and automatic speech recognition may be performed using any techniques known to one of skill in the art as for the first device.

In some embodiments, the second device may not have the audio and may create the second speech recognition results using the first speech recognition results and information on the second device, which may be in the form of a language model. For example, the second device may perform a lattice rescoring. In some embodiments, the second device may use the first speech recognition results to modify models on the second device and then perform speech recognition on the audio using the modified models. In some embodiments, the second device may perform speech recognition on the audio to create temporary speech recognition results, and combine the temporary speech recognition results with the first speech recognition results to create second speech recognition results.

The method proceeds to act 850 where the second speech recognition results are presented to a user. In some embodiments, the speech recognition results may be presented on a display or may be played to the user using speech-to-text software.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method for producing speech recognition results on a receiving device, comprising:
   receiving first speech recognition results from a sending device;
   obtaining a first language model from a source other than an individual user of the receiving device, wherein the first language model represents information stored on the receiving device, and wherein the first language model is associated with the individual user of the receiving device;
   generating a second language model by modifying the first language model based on the first speech recognition results; and
   using the first speech recognition results and the second language model to generate second speech recognition results.

2. The method of claim 1, wherein the method further comprises receiving audio, and wherein using the first speech recognition results and the second language model to generate the second speech recognition results includes using the received audio to generate the second speech recognition results.

3. The method of claim 1, wherein the method further comprises receiving third speech recognition results, and wherein using the first speech recognition results and the second language model to generate the second speech recognition results includes using the third speech recognition results to generate the second speech recognition results.

4. The method of claim 1, wherein the first speech recognition results include a word lattice.

5. The method of claim 1, wherein:
   the obtaining the first language model includes creating the first language model on the receiving device; and the information stored on the receiving device includes address book information.

6. The method of claim 1, wherein the language model is a tri-gram language model.

7. The method of claim 1, wherein the receiving device is a mobile phone.

8. The method of claim 1, wherein the source comprises a voicemail to the individual user of the receiving device.

9. The method of claim 1, wherein the source comprises a network site referencing the individual user of the receiving device.

10. A system for producing speech recognition results on a receiving device, comprising:
    a sending device, including:
       a first memory containing a first program for performing automatic speech recognition; and
       a first processor which, when executing the first program, performs a first operation that includes:
          receiving audio,
          creating first speech recognition results using a first language model and the audio, wherein the first language model represents information stored on the sending device, and
          sending the first speech recognition results;
    a receiving device, including:
       a second memory containing a second program for performing automatic speech recognition; and
       a second processor which, when executing the second program, performs a second operation that includes:
          receiving the first speech recognition results, obtaining a second language model from a source other than an individual user of the receiving device, wherein the second language model represents information stored on the receiving device and, wherein the second language model is associated with the individual user of the receiving device;

generating a third language model by modifying the second language model based on the first speech recognition results; and creating second speech recognition results using the third language model and the first speech recognition results.

11. The system of claim 10, wherein the first operation further includes sending the audio, wherein the second operation further includes receiving the audio and wherein creating the second speech recognition results further includes using the audio.

12. The system of claim 10, wherein the second operation further includes receiving third speech recognition results, and wherein creating the second speech recognition results further includes using the third speech recognition results.

13. The system of claim 10, wherein the first speech recognition results include a confusion network of speech units.

14. The system of claim 10, wherein the first language model is created on the sending device, and wherein the information stored on the sending device includes email messages.

15. The system of claim 10, wherein the first language model is a maximum entropy language model.

16. The system of claim 10, wherein the sending device is a computer server.

17. A non-transitory computer-readable medium containing a program which, when executed, performs a method of producing and presenting speech recognition results, the method comprising:

receiving first speech recognition results;

obtaining a first language model from a source other than an individual user of a device, wherein the first language model represents information stored on the device, and wherein the first language model is associated with the individual user of the device;

generating a second language model by modifying the first language model based on the first speech recognition results;

using the first speech recognition results and the second language model to generate second speech recognition results; and presenting the second speech recognition results to a user.

18. The non-transitory computer-readable medium of claim 17, wherein the method performed by the program further includes receiving audio, and wherein using the first speech recognition results and the second language model to generate the second speech recognition results further includes using the received audio to generate the second speech recognition results.

19. The non-transitory computer-readable medium of claim 17, wherein the method performed by the program further includes receiving third speech recognition results, and wherein using the first speech recognition results and the second language model to generate the second speech recognition results further includes using the third speech recognition results to generate the second speech recognition results.

20. The non-transitory computer-readable medium of claim 17, wherein the first speech recognition results include a word lattice and a phone lattice.

21. The non-transitory computer-readable medium of claim 17, wherein:

the obtaining the first language model includes creating the first language model on the device; and the information stored on the device includes calendar information.

22. The non-transitory computer-readable medium of claim 17, wherein the first language model is created by interpolating other language models.

23. The non-transitory computer-readable medium of claim 17, wherein the source comprises a network site associated with an address stored on the receiving device.

* * * * *